United States Patent [19]

Benzinger

[11] 4,166,390

[45] Sep. 4, 1979

[54] SCANNING RADIOMETER APPARATUS

[76] Inventor: Theodor H. Benzinger, 6607 Broxburn Dr., Bethesda, Md. 20014

[21] Appl. No.: 838,783

[22] Filed: Oct. 3, 1977

[51] Int. Cl.² .................................................. G01J 5/12
[52] U.S. Cl. ........................................ 73/355 R; 250/352
[58] Field of Search ......... 73/190 H, 355 R, 190 EW; 250/352; 338/18

[56] References Cited

U.S. PATENT DOCUMENTS

| | | | |
|---|---|---|---|
| 3,217,538 | 11/1965 | Loeb | 73/190 |
| 3,355,666 | 11/1967 | Vought et al. | 73/193 |
| 3,564,252 | 12/1971 | Stoft | 73/355 |
| 3,720,103 | 3/1973 | Adams et al. | 73/190 |
| 4,063,095 | 12/1977 | Wieder | 250/352 |

Primary Examiner—Herbert Goldstein
Attorney, Agent, or Firm—George R. Douglas, Jr.; Sherman Levy

[57] ABSTRACT

A scanning radiometer having a series of laminations forming a tightly bonded sandwich structure each being electrically insulated from adjacent ones thereof, said series including a thermometric or thermo responsive material, a heat pump functioning material, a heat sink functioning material, and an insulator functioning material, and in which the thermo responsive material is formed of a set of matrix of thin metal alternately with absorptive or blackened portions, each forming opposite arms of a Wheatstone bridge.

The use of the term "thermoelectric or thermoresponsive material" designates a metallic or other electric resistor whose resistance is temperature sensitive and when measured, is an indicator of its temperature. "Heat pump functioning material" is a thermoelectric device that tranfers or "pumps" heat from one of its two surfaces to the other when an electric current is supplied to its terminals. In pumping heat out of the "heat sink functioning material" to the "thermoelectric or thermoresponsive material" or vice vera, it cools or warms the latter until its temperature becomes identical to the mean radiant temperature of the two Pi environment which wants to be measured. Once that is achieved, the heat pump functioning component ceases to pump heat, in either direction, because it receives no current or potential from the Wheatstone bridge formed by a blackened and a reflective thermometer, because the two thermometers read the same termperature when, and only when, their temperatures are equal to the temperature of the mean radiant two Pi environment, and they cancel when the bridge is balanced and its output, consequently, zero.

9 Claims, 4 Drawing Figures

HEAT PUMP

CONSTANT CURRENT

SCANNING RADIOMETER APPARATUS

CROSS REFERENCE TO RELATED INFORMATION

The present application is an improvement and departure from Benzinger U.S. Pat. No. 3,267,727, issued Aug. 23, 1966, and a continuation application of Benzinger application Ser. No. 808,936, filed June 22, 1977 now abandoned.

BACKGROUND OF THE PRESENT INVENTION

The present invention is an improvement and operational scanning radiometer for the purpose of determining the spatial distribution of plane radiant temperature in a given space, and as a result thereof it can be used for determining vector radiant temperature as well as asymmetrical aspects of low temperature radiation within such space. More particularly the invention relates to means of determining asymmetrical indoor radiant vectors within an environment and the effect of asymmetrical thermal radiation on thermal comfort of people, plants, animals and other elements within a closed or indoor space. The density of radiant flux crossing a small plane element in space is found to be a vector quantity with both magnitude and direction components. The radiation vector is a measure of the asymmetry of the radiation field, since the radiation vector is defined as a vector whose direction is perpendicular to the plane element in question and whose magnitude is the difference in the radiant flux impinging on opposite sides of the element.

The invention is a method and apparatus for measuring and determining such vectors by means of a new and improved scanning radiometer apparatus and method.

FIELD OF THE INVENTION

A basic object and feature of the present invention is to provide a new scanning radiometer for the purpose of determining the spatial distribution of plane radiant temperature components in a given closed space and for determining vector radiant temperature components and asymmetrical aspects of low temperature radiation within a given closed or inner space.

More particularly the object and advantage of the present invention is to provide a simple, distinctive, and acceptable manner in which variables of a temperature and radiation vector may be analyzed and determined, for the purpose of determining thermal comfort to animals, plants, and people as well.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT OF THE PRESENT INVENTION

Figure 1:
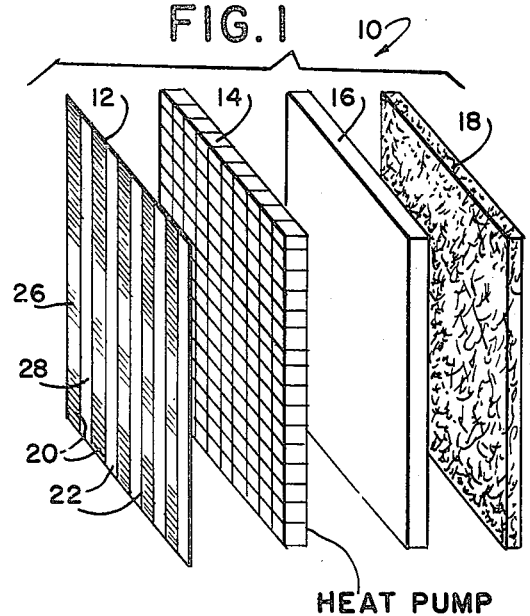
FIG. 1 is an exploded view of a series of laminations forming a portion of a tightly bonded "sandwich" structure as part of a scanning radiometer according to a preferred embodiment of the present invention.

Referring now to the drawings, there is shown a scanning radiometer apparatus 10 having a series of sheets or laminations 12, 14, 16, 18 which are shown in an exploded view in FIG. 1, but which are actually formed in a "sandwich" structure (not shown) in which the laminations 12–18 are tightly and securely bonded to each other in such sandwich fashion. The laminations include at least four laminar components, each being electrically insulated from the adjacent lamination thereto but each one is disposed so that the electrical insulation does not interrupt or modify in any substantial fashion or method possible thermal contact with such adjacent lamination and thus provide maximized electrical insulation between the lamination, particularly laminations 12, 14, 16, and to provide best conditions for thermal contact between these laminations 12, 14, 16.

Figure 3:
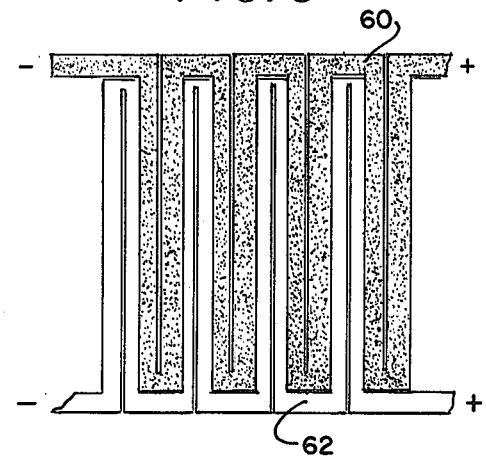
FIG. 3 shows a detailed feature of a component element exemplary of what may be used in the practice of the invention.
Figure 2A:
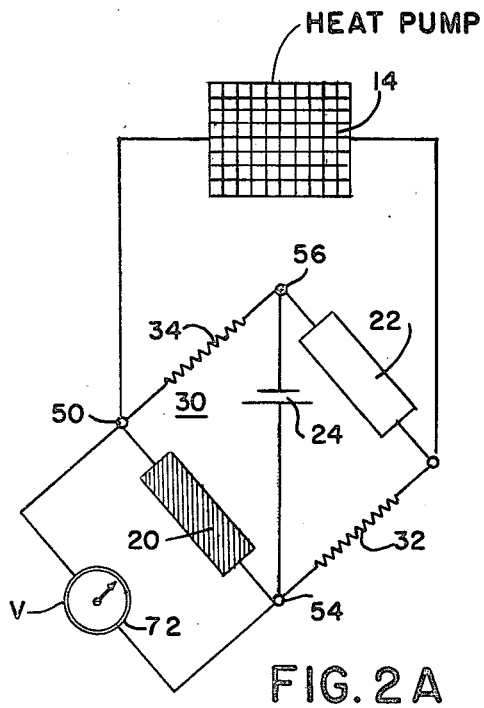
FIGS. 2A and 2B are schematic electrical circuit diagrams according to the preferred embodiments of the present invention.
Figure 2B:
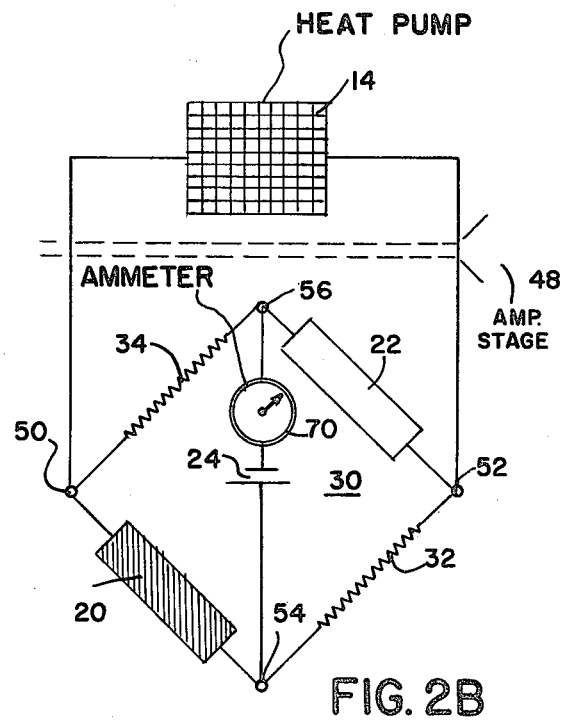

Lamination 12 is a deposit of material of a high temperature coefficient of electrical resistance, preferably constructed in a "comb pattern" as shown in FIG. 3. Two geometrically interlaced, but electrically independent "comb patterns", one 20 having an absorptive surface, and the other 22 having a reflective surface, and each forming a contiguous electrical resistor, and the two of them 20, 22 forming opposite arms of a Wheatstone bridge as shown in FIG. 2A or 2B. The other two opposite arms of the bridge are fixed, temperature insensitive resistors 32 and 34 and being external of the structure of FIG. 1.

The bridge 30 is supplied with a voltage from source 24 and balanced when no thermal radiation is incident upon the surface of arms 20, 22, that is when the radiant temperature of the 2 Pi environment is identical with the surface temperature of the resistors 20, 22. Now, as soon as the radiant temperature of the environment changes or deviates from the surface temperature of the resistors 20, 22, the black resistor 20 will become warmer than the reflective resistor 22. As a result thereof the bridge will now be or become unbalanced. The voltage from the bridge 30 as an error signal, preferably reinforced by an amplifier 48 will now energize thermopile 14 which functions as a "heat pump," transforming heat from its "hot" junctions adjacent to the heat sink functioning material 16 to its cold junctions adjacent to the thermopiles, lamination 12, a resistance thermometer which thereby increases its temperature until it is identical with the radiant environment whereupon the bridge is balanced and does not longer energize the heat pump thermopile 14 and does no longer transfer heat from the heat sink functioning material 16 to the thermometer 12. In consequence the thermopile 14 will pump heat out of the heat sink 16 throughout the surfaces 20, 22 until the bridge 30 is again balanced; this means now that the resistors 20, 22 now have the same temperature as the radiant environment of lamination 12.

Readout of the Mean Radiant Temperature of the 2 Pi environment is obtained by reading the ammeter 70 of FIG. 2B where the source 24 is a conventional constant voltage source; when the source 24 is a conventional type constant current source, voltmeter 72 provides readout of the Mean Radiant Temperature of the 2 Pi environment.

The resistors 32, 34 may be preferably of a low temperature coefficient material of electrical resistance, and by use thereof in the Wheatstone bridge as shown, a battery or source 40 is applied across one portion of the bridge and output conductors 42, 44 are connected from the output of the bridge 32 and amplifier stage or stages 48 shown in FIG. 2 for detecting and indicating by it's output when an essentially null or balanced value of the Wheatstone bridge is arrived at. Thus, when the bridge is balanced, there is no difference in value of the resistance of the blackened series of strips and the radiative strips forming the sets 20, 22 accordingly.

The amplifier 48 is connectively responsive to the output of the Wheatstone bridge as above described and provides a developed signal selectively applied to the heat pump functioning material and the heat sink functioning material as described. The insulator functioning material 18 is so positioned within the series of laminations 12–18 such that it is the rearward layer of the series and serves to protect the measurement and thermal values of the series from externally oriented thermal changes disposed upon the rearward side of the scanning radiometer.

It should be noted that the Bureau of Standards article published during 1976 entitled "The Design, Construction and Operation of a Scanning Radiometer for Measurement of Plane Radiant Temperature in Buildings" is incorporated herein by reference.

FIGS. 2A and 2B show embodiments of circuit components that may be used in the invention. FIG. 3 shows a set or series of blackened resistance strips 60, 60, 60 and reflective resistance strips 62, 62, 62 disposed in a heat sink 66.

FIG. 3 shows how such an arrangement can be folded of blackened resistance elements 60 and reflective resistance elements 62 according to the invention.

In summary, the bridge is balanced when resistors 20, 22 are at the same temperature, that is, when their common temperature is identical with a third temperature, namely, the directional Two Pi mean radiant temperature of the environment which the instrument may face, or faces.

A "radiation source" arises only if and when the environmental two Pi mean radiant temperature begins to deviate from the surface temperature of the instrument, then black resistor 20 will become warmer or cooler than reflective resistor 22. Immediately heat pump 14 will accordingly selectively heat or cool both resistors 20 and 22 until they have re-assumed the radiant temperature of the environment. As soon as that is accomplished the temperatures of resistors 20, 22 will become equal because there is now no "source radiation" and there is no reason for resistor 20 to be either warmer or cooler than resistor 22. As an equilibrium is approached, the difference between resistors 20 and 22 disappears as well as the difference between the instrument and its two Pi environment.

By this means as long as the control circuit and the heat pump are working, resistor 20 and 22 will be maintained at the temperature of the environment and at identical temperatures. (The "Zeroth" Law of Thermodynamics states that if a body 1 and a body 2 have identical temperatures, and a body 3 has a temperature identical with body 1, then body 2 and body 3 are identical in temperature.)

In a different embodiment of the invention, the two Pi radiant temperature of the environment is measured without a servomechanism, simply by measurement of radiant heat flux into or out of a heat sink of known temperature. Two sets of thermopiles, preferably of the semiconductor, multijunction type, are bonded with their "cold" junctions to the surface of a metal block with perfect electrical insulation, yet maximum thermal contact in a chessboard pattern. One set is provided with reflective surfaces, the other with black surfaces, absorptive for infrared over the "hot" junctions. All of the reflective thermopiles are wired in series, and all of the black thermopiles are wired in another series. The two serially wired sets are wired into one measuring circuit, in series and in opposition.

As a result the potential from the reflective set in response to heatflow is subtracted from the potential generated in the black set or series.

Since both sets are equally sensitive to heat transfer by conduction-convection, the resulting potential is caused exclusively by the difference in radiant flux through the shiny piles or the black piles, respectively. This radiometer will therefore read the same, when tested in an air-filled chamber or in vacuum. It is insensitive to heat transfer by conduction-convection. The potential from the thermopile arrangement is suited to read out the radiant flux in calories per unit time and unit surface temperature. In order to read the instrument in terms of plane radiant environmental temperature, the voltage from the piles must be added, by serial wiring, to the potential from an electric thermometer inside the heat sink to which the piles are bonded. A platinum thermometer reading 20 millivolts at 20 degrees Celsius and one millivolt per degree Celsius is best suited for this purpose.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A scanning radiometer comprising a series of laminations forming a tightly bonded sandwich structure including at least four laminar components each being insulated electrically from the adjacent one yet disposed in best conditions possible for thermal contact therewith, and such series including (a) two surface thermometers, one absorptive, the other reflective of thermal radiation forming an interwoven pattern of alternating absorptive and reflective surfaces, (b) a heat pump for transfer of heat between the surface thermometers and a heat sink, (c) a heat sink functioning material, and (d) an insulator functioning material.

2. The invention of claim 1 wherein each thermoresponsive material has its surface formed of sets of a matrix of thin thermosensitive or thermoresponsive metal or metal deposit strips, one set being reflective of radiant heat and another set being blackened for being absorptive of radiant heat, each set being mutually interconnected electrically in series to each form an arm of a Wheatstone bridge, and the other two arms of the bridge being formed of fixed and unchangeably valued resistors of a metal of low temperature coefficient of electrical resistance (LTC metal), and the output of said bridge being essentially null when the resistance of the blackened series of strips and the reflective series of strips are identical and equal in value.

3. The invention of claim 2 wherein a servomechanism means includes means to heat or cool the surface of the thermoresponsive material whenever a voltage other than said null value is derived from the Wheatstone bridge and such inclusion is circuit means selectively driving the heat pump functioning material, to pump heat from the surface into the heat sink and vice versa.

4. The invention of claim 3 wherein said servomechanism means is amplifier means connectively responsive to the output of the Wheatstone bridge developing a signal selectively applied to the heat pump functioning material.

5. The invention of claim 1 wherein said insulator functioning material is so positioned within said series such as upon the rearward layer of said series serving to protect the measurement and thermal values of said series from externally oriented thermal changes disposed upon the rearward side of the scanning radiometer.

6. The invention of claim 1 wherein the temperature of the thermoresponsive material is identical with the 2 Pi radiant temperature of the environment whenever the bridge is balanced.

7. The invention of claim 1 wherein the temperature of the thermosensitive material which is identical to the radiant temperature of the 2 Pi environment is read out as a voltage drop across one of the thermosensitive resistors while the bridge is supplied with constant current (on appropriate or proper calibration).

8. The invention of claim 1 wherein a servomechanism including a heat pump renders the temperature of the thermosensitive resistors identical to or with the two Pi radiant temperature environment.

9. The invention of claim 1 wherein the temperature of the thermosensitive material which is identical with the radiant temperature of the two Pi environment is read out as current flow through the bridge when supplied with a constant voltage.

* * * * *